United States Patent
Lee

(10) Patent No.: US 8,341,939 B2
(45) Date of Patent: Jan. 1, 2013

(54) PURIFICATION SYSTEM FOR VARIABLE POST INJECTION IN LP EGR AND CONTROL METHOD FOR THE SAME

(75) Inventor: Jin Ha Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 689 days.

(21) Appl. No.: 12/511,690

(22) Filed: Jul. 29, 2009

(65) Prior Publication Data

US 2010/0132356 A1     Jun. 3, 2010

(30) Foreign Application Priority Data

Nov. 28, 2008   (KR) .................. 10-2008-0120064

(51) Int. Cl.
*F01N 5/04*    (2006.01)
*F01N 1/00*    (2006.01)

(52) U.S. Cl. ............................. 60/280; 60/324
(58) Field of Classification Search ........... 60/278, 60/280, 295, 297, 301, 303, 311, 324
See application file for complete search history.

(56) References Cited

U.S. PATENT DOCUMENTS

| | | | | |
|---|---|---|---|---|
| 4,612,770 A * | 9/1986 | Tadokoro et al. | | 60/602 |
| 6,352,068 B1 * | 3/2002 | Jacobsen | | 123/585 |
| 6,655,133 B2 * | 12/2003 | Kimura et al. | | 60/296 |
| 6,681,566 B2 * | 1/2004 | Itoh et al. | | 60/288 |
| 6,990,803 B2 * | 1/2006 | Koga et al. | | 60/295 |
| 7,261,086 B2 * | 8/2007 | Nuang | | 123/436 |
| 7,430,856 B2 * | 10/2008 | Miyazaki et al. | | 60/287 |
| 7,490,462 B2 * | 2/2009 | Roozenboom et al. | | 60/278 |
| 7,673,720 B2 * | 3/2010 | Meneely et al. | | 181/254 |
| 8,091,338 B2 * | 1/2012 | Yokoyama et al. | | 60/278 |
| 2003/0196429 A1 * | 10/2003 | Nakatani et al. | | 60/288 |
| 2007/0130919 A1 * | 6/2007 | Lee | | 60/286 |
| 2008/0155972 A1 * | 7/2008 | Driscoll et al. | | 60/299 |
| 2008/0314036 A1 * | 12/2008 | Yokoyama et al. | | 60/303 |
| 2009/0277431 A1 * | 11/2009 | Nitzke et al. | | 123/568.12 |
| 2009/0282816 A1 * | 11/2009 | Li et al. | | 60/289 |

FOREIGN PATENT DOCUMENTS

| KR | 20070052495 | * | 7/2008 |
|---|---|---|---|
| WO | WO 2008/058596 A1 | | 5/2008 |

OTHER PUBLICATIONS

Machine Translation KR20070052495.*

* cited by examiner

*Primary Examiner* — Thomas Denion
*Assistant Examiner* — Dapinder Singh
(74) *Attorney, Agent, or Firm* — Morgan, Lewis & Bockius LLP

(57) ABSTRACT

A purification system for variable post injection in LP EGR, the system includes a turbo charger disposed downstream of a diesel engine, a DPF (catalyzed particulate filter) disposed downstream of the turbo charger, a NOx reduction apparatus disposed upstream or downstream of the DPF, a bypass line diverged from the DPF for mixing exhaust gas and air inflowing the turbo charger, a exhaust gas control portion disposed downstream of the DPF for controlling flowing of the exhaust gas and a lean/rich controlling portion for controlling lean/rich of the exhaust gas.

6 Claims, 6 Drawing Sheets

(a)

(b)

(c)

(d)

(e)

PURIFICATION SYSTEM FOR VARIABLE POST INJECTION IN LP EGR AND CONTROL METHOD FOR THE SAME

CROSS-REFERENCE TO RELATED APPLICATION

The present application claims priority to Korean Patent Application Number 10-2008-0120064 filed on Nov. 28, 2008, the entire contents of which application is incorporated herein for all purposes by this reference.

BACKGROUND OF THE INVENTION

1. Field of the Invention

The present invention relates to purification of an exhaust gas of a diesel engine vehicle. More particularly, the present invention relates to a purification system for variable post injection in LP EGR and the control method for the same.

2. Description of Related Art

Nitrogen oxides (NOx) and particulate matters (PM) are principal air pollution material of a diesel engine vehicle. Therefore, they are under strict emission regulation of a diesel engine.

Several technologies have been developed to cope with the emission regulation of the diesel engine. For example, fuel injection timing may be delayed. In addition, exhaust gas recirculation (EGR) has been enhanced such that NOx exhaust may be reduced. In addition, combustion characteristic of the diesel engine has been improved so as to reduce PM.

Such technologies for complying with the diesel engine emission regulation may be classified into an engine improving technology and a post-processing technology. Examples of the post-processing technology for reducing the principal exhaust gas of the diesel engine are (1) oxidation catalyst for purifying high boiling point hydrocarbon (HC) among the particulate matters, (2) a DeNOx catalyst for decomposition or reduction of the NOx under an excess oxygen atmosphere, and (3) a diesel particulate filter (DPF) system filtering the PM.

Among such a post-processing technology, a simultaneous NOx-PM reduction apparatus having a lean NOx trap (LNT) and a Diesel particulate filter (DPF) is also included. Regarding the simultaneous NOx-PM reduction apparatus, it is believed that simultaneous generation of the LNT and DPF is not possible. In addition, the regeneration of LNT is required to be performed in a rich range of an air/fuel ratio, and thus the regeneration of the LNT causes a substantial amount of PM.

The DPF system has a merit that PM is sufficiently trapped so as to substantially decrease an exhaust of the PM. However, apparatus and/or algorithm for a regeneration control of the trapped PM by an after-burning thereof have not sufficiently investigated. Consequently, in the state of the art, durability of the DPF is still problematic since an excessive heat may be produced during the regeneration of the filter thereby causing a damage of the DPF. In addition, during a large scale of EGR for removal of the NOx, a substantial amount of the PM is produced.

Therefore, in this case, a PM trapping limit of a catalyst support of the DPF easily becomes saturated, and this may be a cause of the damage of the support of the DPF during an active regeneration of the DPF.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a purification system for variable post injection in LP EGR, including a turbo charger disposed downstream of a diesel engine, a DPF(catalyzed particulate filter) disposed downstream of the turbo charger, a NOx reduction apparatus disposed upstream or downstream of the DPF, a bypass line diverged from the DPF for mixing exhaust gas and air inflowing the turbo charger, a exhaust gas control portion disposed downstream of the DPF for controlling flowing of the exhaust gas and a lean/rich controlling portion for controlling lean/rich of the exhaust gas.

The lean/rich controlling portion may include a post injector disposed upstream of the NOx reduction apparatus and a injector control portion that determines injecting timing of the post injector according to NOx concentration and amount of the NOx and modulates fuel injection patterns according to engine driving conditions.

The NOx reduction apparatus may include a DFC, a NOx storage catalyst and an anti HC slip catalyst.

The NOx reduction apparatus may further include an additional coating portion that is disposed upstream of the NOx storage catalyst for generating a reducing agent.

The system may further include an oxygen sensor disposed between the DPF and the NOx reduction apparatus, a temperature sensor disposed between the DPF and the NOx reduction apparatus, a HC slip sensor disposed downstream of the NOx reduction apparatus and a NOx sensor disposed at least one position of forward or rearward of the NOx reduction apparatus, wherein the injector control portion that receives operation states information including amount of NOx in the exhaust gas, temperature of the exhaust gas, HC slip amount and NOx generation, and controls injecting timing and modulating patterns of the post injector.

The fuel injection pattern may include a uniform injecting pattern, an injecting pattern that is concentrated in its early stages, an injecting pattern that is concentrated in its middle stages, an injecting pattern that is concentrated in its early and last stages and an injecting pattern that is concentrated in its last stages.

The exhaust gas control portion may include a first throttle flap that controls flowing of exhaust gas flowing to the NOx reduction apparatus and a second throttle flap that controls flowing of exhaust gas flowing to the bypass line, wherein the first throttle flap and the second throttle flap are vertically disposed to each other.

The exhaust gas control portion may further include a DC motor and the DC motor controls openings of the first throttle flap and the second throttle flap simultaneously.

The system may further include an oxygen sensor disposed between the DPF and the NOx reduction apparatus, a temperature sensor disposed between the DPF and the NOx reduction apparatus, a HC slip sensor disposed downstream of the NOx reduction apparatus, a NOx sensor disposed at least one position of forward or rearward of the NOx reduction apparatus and a throttle flap opening sensor for sensing opening of the first throttle flap and the second throttle flap, wherein the injector control portion receives operation states information including amount of NOx in the exhaust gas, temperature of the exhaust gas, HC slip amount, NOx generation and throttle openings, and controls injecting timing and modulating patterns of the post injector.

A controlling method for a purification system for variable post injection in LP EGR according to an exemplary embodiment of the present invention, including a first flap that controls flowing of exhaust gas flowing to a NOx reduction apparatus and a second throttle flap that controls flowing of exhaust gas flowing to the bypass line, the control method may include determining regeneration timing based on a calculated NOx amount according to engine operation conditions and a measured NOx concentration in the exhaust gas by a NOx sensor, determining fuel injection patterns according to the NOx concentration, and injecting a post injection according to the determined pattern, determining whether the engine operation condition is changed during regeneration of the NOx storage catalyst, closing the second throttle flap and turning off the post injector if the engine operation speed is decreased during regeneration of the NOx storage catalyst and increment of oxygen concentration in the exhaust gas is equal or larger than a predetermined value, determining whether HC slip amount is equal or larger than a predetermined value, modulating injecting pattern of the post injector if the HC slip amount is equal or larger than the predetermined value and maintaining regeneration of the NOx storage catalyst if the HC slip amount is less than the predetermined value when the engine operation speed is decreased during regeneration of the NOx storage catalyst and increment of oxygen concentration in the exhaust gas is less than the predetermined value, determining the fuel injection pattern according to increment of the NOx when the engine operation speed is increased during regeneration of the NOx storage catalyst and determining whether closing regeneration of the NOx storage catalyst according to concentration of the NOx in the exhaust gas when the engine operation condition is not changed during regeneration of the NOx storage catalyst.

The determining regeneration timing may further include calculating the NOx generation by sensing the engine driving conditions and measuring the throttle flap opening.

The controlling method may further include controlling temperatures of the exhaust gas and the oxygen concentration in the exhaust gas after the determining regeneration timing.

The controlling temperatures of the exhaust gas and the oxygen concentration in the exhaust gas may include controlling temperatures of the exhaust gas to be higher than 200° C. and oxygen concentration in the exhaust gas to be lower than 3% by controlling the first throttle flap opening and the second throttle flap opening.

The first throttle flap opening and the second throttle flap opening may be controlled by PID control.

The fuel injection patterns may include a uniform injecting pattern when the concentration of the NOx in the exhaust gas is less than 43 ppm, an injecting pattern that is concentrated in its early stages when the concentration of the NOx in the exhaust gas is equal or larger than 43 ppm and lower than 290 ppm and an injecting pattern that is concentrated in its last stages when the concentration of the NOx in the exhaust gas is larger than 290 ppm.

The predetermined value, for the increment of oxygen concentration in the exhaust gas when the engine operation speed is decreased during regeneration of the NOx storage catalyst gas, may be 5%.

The controlling method may further include maintaining regeneration of the NOx storage catalyst if generating amount of the NOx is not increased when the engine operation speed is increased and closing the second throttle flap in a predetermined angle if generating amount of the NOx is increased when the engine operation speed is increased, and then maintaining regeneration of the NOx storage catalyst if generating amount of the NOx is not increased and changing the injecting pattern if generating amount of the NOx is increased.

The controlling method may further include sensing the concentration of NOx when it is determined that the engine operation condition is not changed, terminating the post injection and the regeneration of the NOx storage catalyst when concentration of the NOx is less than a predetermined amount and maintaining regeneration of the NOx storage catalyst when concentration of the NOx is not less than a predetermined amount.

The purification system for variable post injection in LP EGR and control method for the same according to an exemplary embodiment of the present invention may reduce NOx generation in the LP EGR, and precisely control regeneration of the NOx storage catalyst according to generation of the EGR gas and NOx, the engine operation conditions and so on so that air pollution material can be reduced and also fuel efficiency can be enhanced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
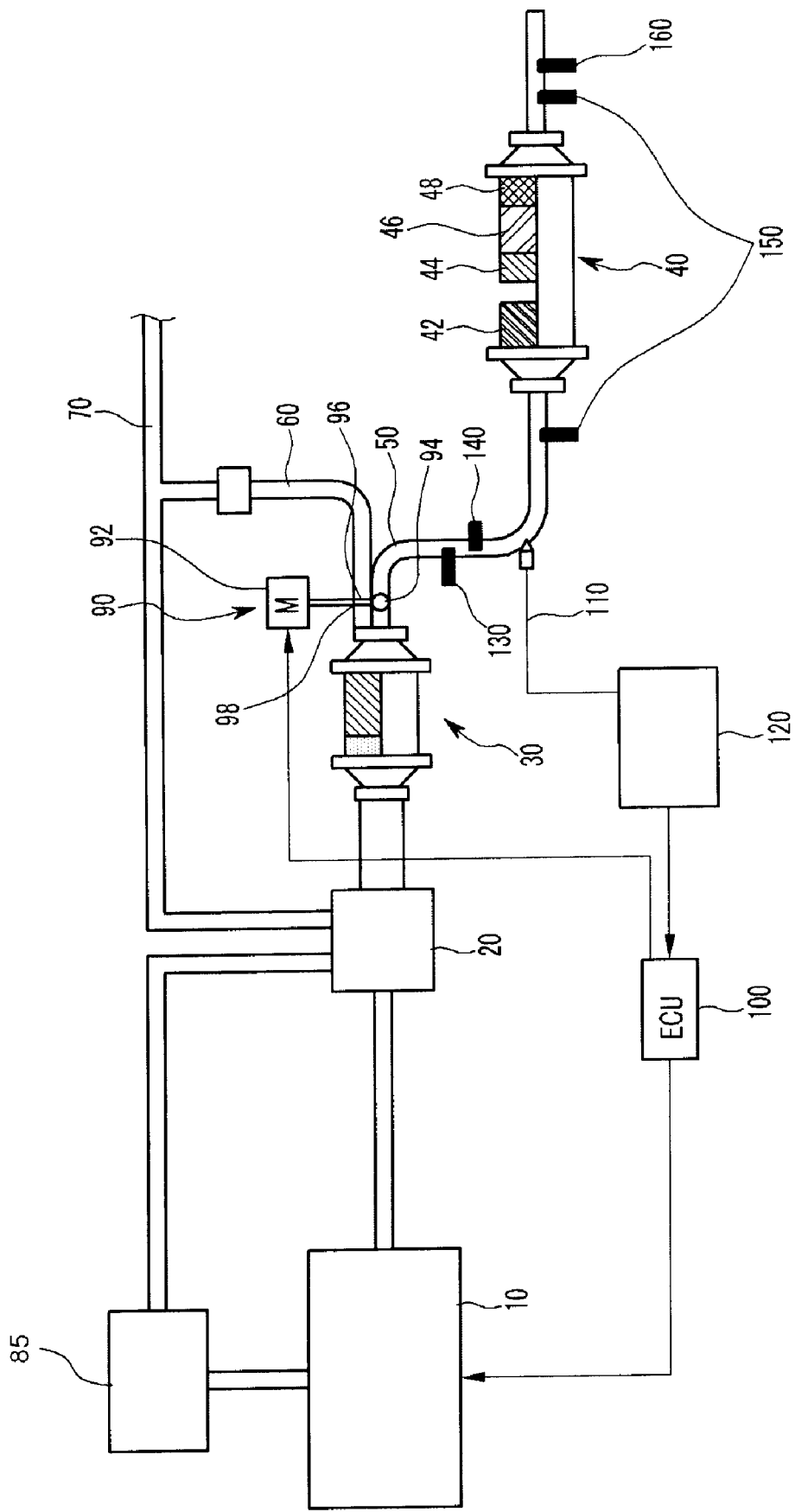
FIG. 1 is a schematic diagram of an exemplary purification system for variable post injection in LP EGR according to the present invention.
Figure 2:
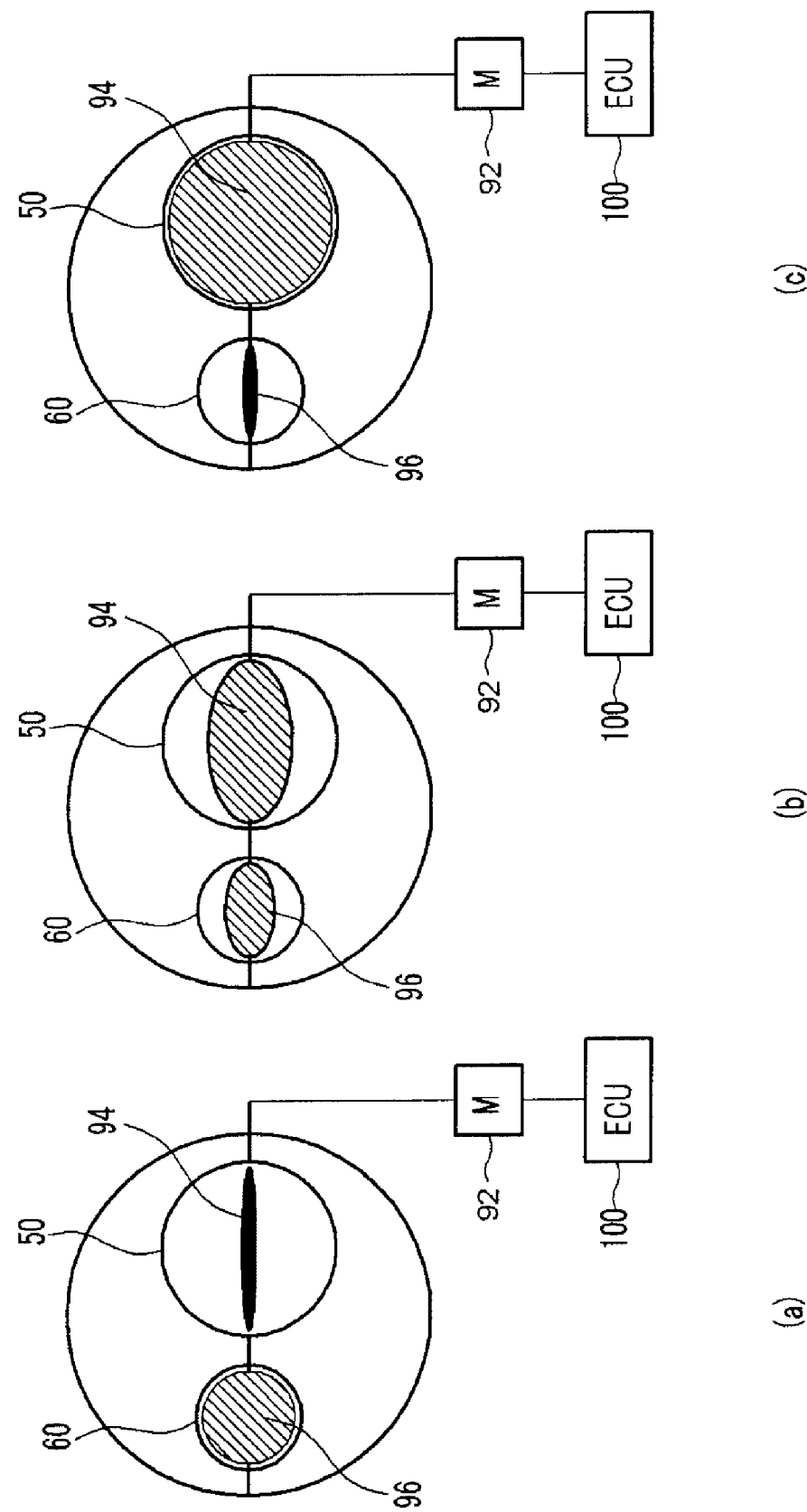
FIG. 2 is a drawing showing an exhaust gas control portion of an exemplary purification system for variable post injection in LP EGR according to the present invention.

FIG. 1 is a schematic diagram of a purification system for variable post injection in LP EGR and FIG. 2 is a drawing showing an exhaust gas control portion of a purification system for variable post injection in LP EGR according to various embodiments of the present invention.

Referring to FIG. 1 and FIG. 2, a purification system for variable post injection in LP EGR according to various embodiments of the present invention includes a turbo charger 20 disposed downstream of a diesel engine 10, a DPF (catalyzed particulate filter) 30 disposed downstream of the turbo charger 20 and a NOx reduction apparatus 40 disposed downstream of the DPF 30, and the DPF 30 and the NOx reduction apparatus 40 are connected by a exhaust line 50.

The DPF 30 can capture PM (Particulate Matters) using a filter.

A bypass line 60 is diverged from the DPF 30 for mixing exhaust gas and air inflowing the turbo charger 20, an exhaust gas control portion 90 is disposed downstream of the DPF 30 for controlling flowing of the exhaust gas and a lean/rich controlling portion for controlling lean/rich of the exhaust gas is disposed.

The lean/rich controlling portion includes a post injector 110 that is disposed between the DPF 30 and the NOx reduction apparatus 40 and a injector control portion 120 that is provided for determining injecting timing of the post injector 110 according to NOx concentration and amount of the NOx and modulating fuel injection patterns according to engine driving conditions.

The bypass line 60 is connected to an air inflow line 70 and exhaust gas in the bypass line 60 and the air in the air inflow line 70 are mixed and compressed in the turbo charger 20. And then the mixture is supplies to the engine 10 after cooled in an intercooler 85.

The NOx reduction apparatus 40 includes a DFC (Diesel Fuel Cracking catalyst; 42), a NOx storage catalyst 46, an anti HC slip catalyst 48 and an additional coating portion 44 disposed forward of the NOx storage catalyst 46.

The DFC converts the injected diesel fuel gas into more effective reductants such as $H_2$, CO and low chain hydrocarbon.

Such a NOx storage catalyst adsorbs the NOx in the lean combustion range and enables reduction of the adsorbed NOx in the rich combustion range above the theoretical air/fuel ratio.

The additional coating portion 44 generates additional reducing agents.

The purification system for variable post injection in LP EGR includes an oxygen sensor 130 disposed between the DPF 30 and the NOx reduction apparatus 40, a temperature sensor 140 disposed between the DPF 30 and the NOx reduction apparatus 40, a HC slip sensor 160 disposed downstream of the NOx reduction apparatus 40, and a NOx sensor 150 disposed at least one position of forward or rearward of the NOx reduction apparatus 40. The injector control portion 120 receives operation states information including amount of NOx in the exhaust gas, temperature of the exhaust gas, HC slip amount and NOx generation, and controls injecting timing and modulating patterns of the post injector.

If the engine quickly reduces its speed and fuel injection amount and injection conditions are not in harmony, the HC may be generated to be slipped, and the anti HC slip catalyst 48 is provided for preventing from HC slip.

Figure 6:
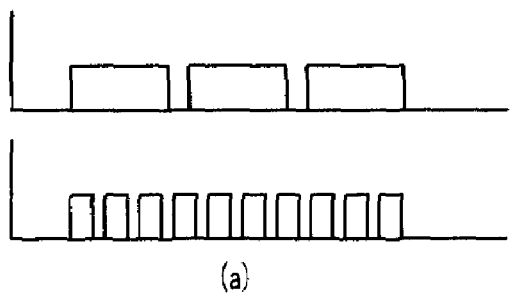
FIG. 6 is a graph showing injection patterns of an exemplary post injector according to the present invention.
Figure 6:
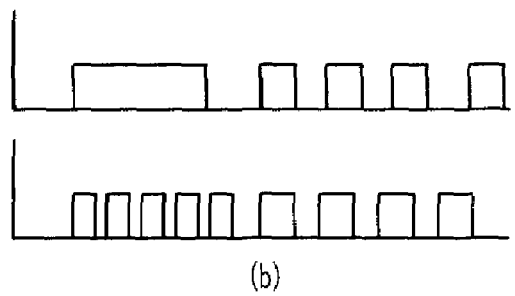
Figure 6:
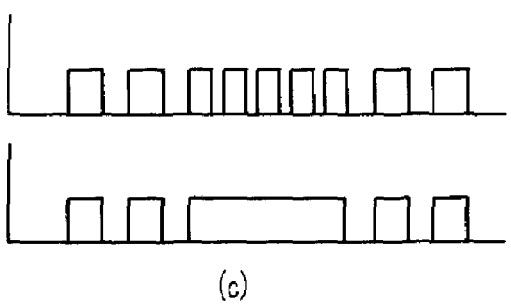
Figure 6:
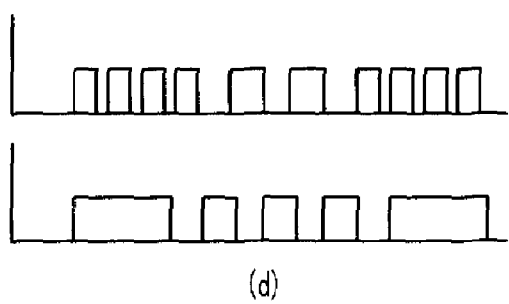
Figure 6:
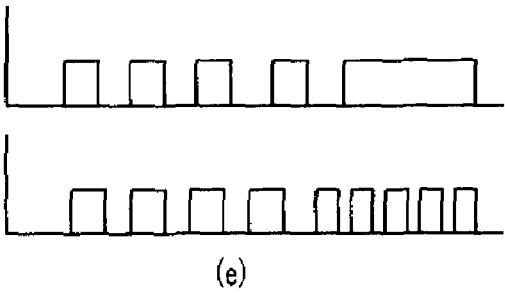

The fuel injection pattern includes a uniform injecting pattern, an injecting pattern that is concentrated in its early stages, an injecting pattern that is concentrated in its middle stages, an injecting pattern that is concentrated in its early and last stages and an injecting pattern that is concentrated in its last stages, and the injection patterns are described in FIG. 6.

The exhaust gas control portion 30 includes a first throttle flap 94 that controls flowing of the exhaust gas flowing to the NOx reduction apparatus 40 and a second throttle flap 96 that controls flowing of the exhaust gas flowing to the bypass line 60.

As shown in FIG. 2, the first throttle flap 94 and the second throttle flap 96 are vertically disposed to each other, and a DC motor 92 is connected to the first throttle flap 94 and the second throttle flap 96 and controls openings of the first throttle flap 94 and the second throttle flap 96 simultaneously.

An ECU 100 calculates openings using PID (Proportional Integral Differential) control and controls the DC motor 92 using PWM (pulse width modulation) duty control for controlling opening of the first throttle flap 94 and the second throttle flap 96 and thus oscillation due to differences between target distribution of the exhaust gas and actual distribution of the exhaust gas can be reduced.

The ECU 100 receives information for controlling the engine such as engine operation speed, fuelling, engine temperature, exhaust gas temperature, EGR cooler temperature, air inflow amount and temperature and so on.

Using the information, the ECU 100 may use Feed Forward Control for determining PWM duty for controlling the DC motor 92.

The openings of the first throttle flap 94 and the second throttle flap 96 are detected by a throttle flap opening sensor 98, and the injector control portion 120 further uses information including throttle openings detected by the throttle flap opening sensor 98 and controls injection timing and patterns of the injector 110.

General NOx storage catalyst regeneration is performed according to NOx concentration. However, the injector control portion 120 according to various embodiments of the present invention determines regeneration timing and injection patterns compatible with the engine operation conditions using above said information.

The fuel injected from the post injector 110 is converted by the DFC 42 and supplied to the NOx storage catalyst 46 and HC generated the DFC 42 eliminates NO in the NOx storage catalyst 46.

As described above, the purification system for variable post injection according to various embodiments of the present invention is applicable to the LP (Low Pressure) EGR that uses clean EGR gas passed through purification device in low temperature and pressure and eliminates PM, NOx and so on at the same time.

In the FIG. 1, while the NOx reduction apparatus 40 is disposed downstream of the DPF 30, it is not limited to the drawing, however, the DPF 30 can be disposed downstream of the NOx reduction apparatus 40, and the reversed scheme can realize the above said result and repeated explanation will be omitted.

Hereinafter, a controlling method for a purification system for variable post injection in LP EGR according to various embodiments of the present invention will be described referring to FIG. 3 and FIG. 4.

A controlling method for a purification system for variable post injection in LP EGR according to various embodiments of the present invention, including the first flap 94 that controls flowing of exhaust gas flowing to the NOx reduction apparatus 40 and the second throttle flap 96 that controls flowing of exhaust gas flowing to the bypass line 60, the control method includes determining regeneration timing (S300) based on a calculated NOx amount according to engine operation conditions and a measured NOx concentration in the exhaust gas by a NOx sensor (S308, S310), and determining fuel injection patterns according to the NOx concentration, and injecting a post injection according to the determined pattern (S350).

The determining regeneration timing (S300) further includes calculating the NOx generation (S306) by sensing the engine driving conditions (S302) and measuring the throttle flap opening (S304).

Figure 3:
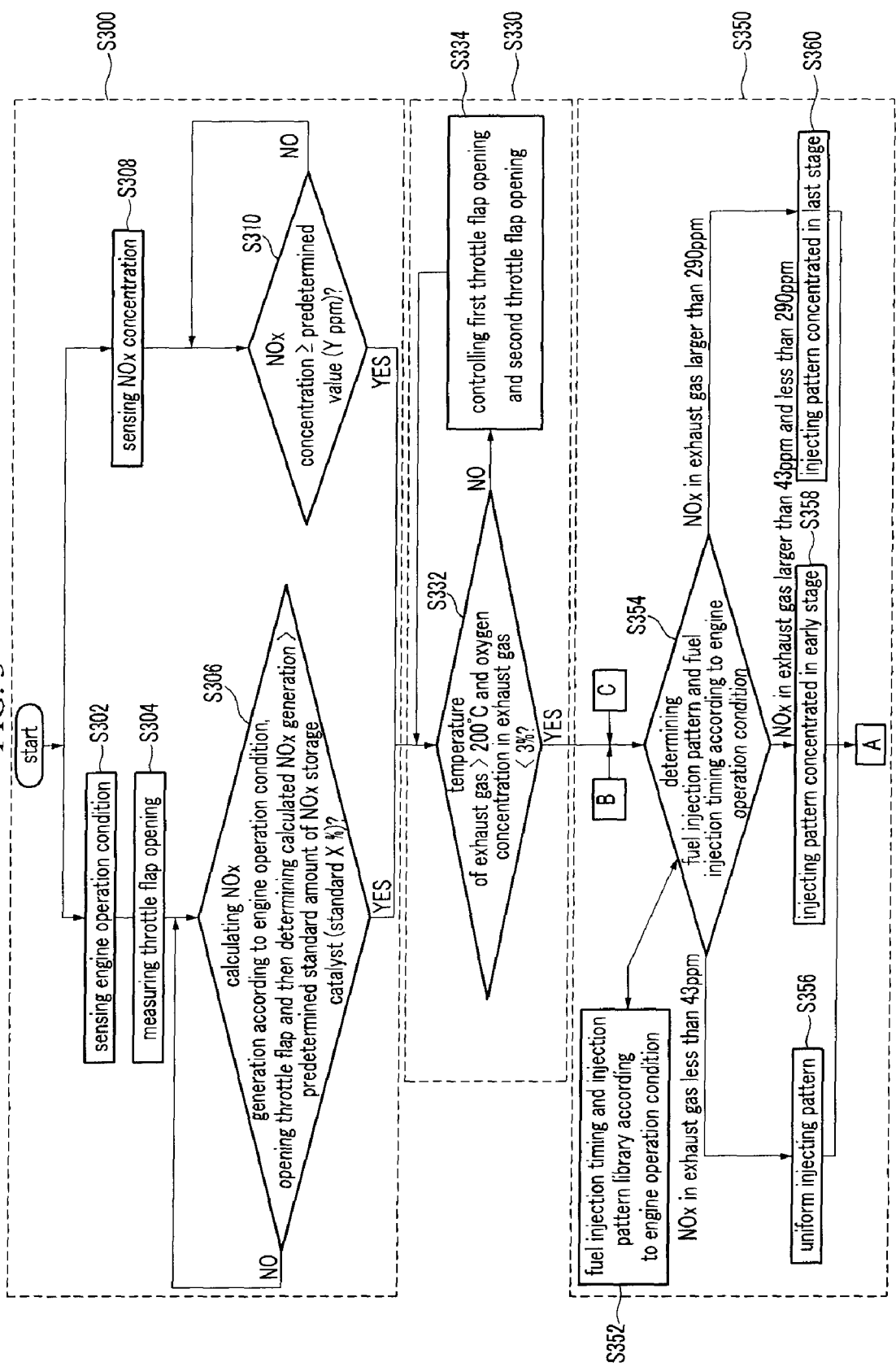
FIG. 3 is a flowchart showing determining regeneration timing and determining fuel injection patterns of an exemplary controlling method for a purification system for variable post injection in LP EGR according to the present invention.

In the step S306 of FIG. 3, it is determined whether the calculated NOx generation is larger than a predetermined standard amount of the NOx storage catalyst (standard X %), and predetermined standard amount of the NOx storage catalyst is determined by a kind and capacity of the NOx storage catalyst.

In the step S310 of FIG. 3, it is determined whether the measured NOx concentration is larger than a predetermined value (Y ppm), and the predetermined value (Y ppm) is predetermined by a kind and capacity of the NOx storage catalyst.

After determining regeneration timing (S300), temperatures of the exhaust gas and the oxygen concentration in the exhaust gas are controlled (S330).

The controlling temperatures of the exhaust gas and the oxygen concentration in the exhaust gas (S330) is performed by controlling temperatures of the exhaust gas to be higher than 200° C. and oxygen concentration in the exhaust gas to be lower than 3% by controlling the first throttle flap 94 opening and the second throttle flap 96 opening (S334).

The first throttle flap 94 opening and the second throttle flap 96 opening can be calculated and determined by the PID control.

In the determining fuel injection patterns (S350), the fuel injection timing is determined according to the engine operation conditions and the injection pattern is determined using stored data (S352, S354).

Figure 5:
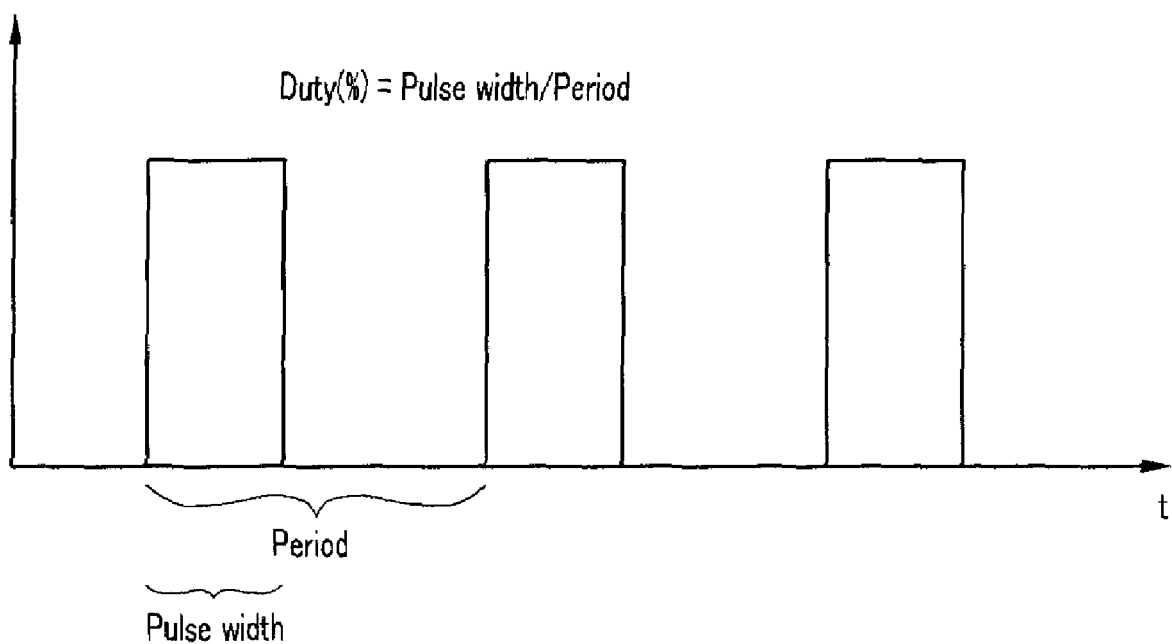
FIG. 5 is a graph explaining injection pattern of a post injector.

FIG. 5 is a graph explaining injection pattern of a post injector and FIG. 6 is a graph showing injection patterns of a post injector according to various embodiments of the present invention.

The injection pattern of a post injector is defined as pulse width per injecting period.

In this case, the fuel injection patterns include an uniform injecting pattern (S356) when the concentration of the NOx in the exhaust gas is less than 43 ppm as shown in FIG. 6(a), an injecting pattern that is concentrated in its early stages (S358) when the concentration of the NOx in the exhaust gas is equal or larger than 43 ppm and lower than 290 ppm as shown in FIG. 6(b), and an injecting pattern that is concentrated in its last stages (S360) when the concentration of the NOx in the exhaust gas is larger than 290 ppm as shown in FIG. 6(e).

In FIG. 6, a graph (c) shows an injecting pattern that is concentrated in its middle stages and a graph (d) shown an injecting pattern that is concentrated in its early and last stages.

The injecting patterns of (c) and (d) in FIG. 6 can be included according to the engine operation conditions.

Figure 4:
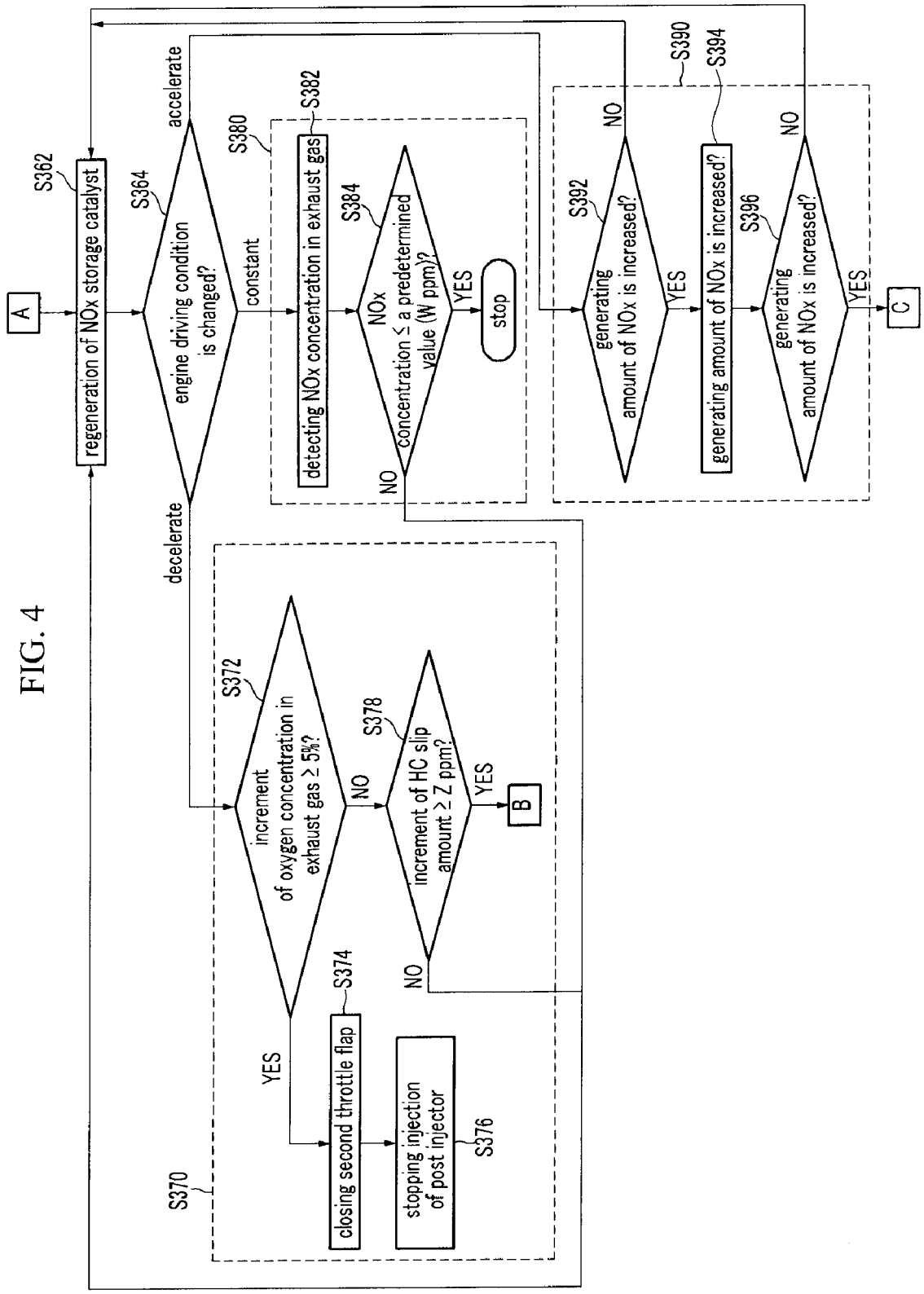
FIG. 4 is a flowchart showing modulating fuel injection patterns according to engine operation conditions of an exemplary controlling method for a purification system for variable post injection in LP EGR according to the present invention.

In FIG. 4, it is detected whether the engine driving condition is changed (S364) during the regeneration of the NOx storage catalyst (S362), and if the engine driving speed is decreased during regeneration of the NOx storage catalyst and increment of oxygen concentration in the exhaust gas is equal or larger than a predetermined value (S372), the second throttle flap 96 is closed (S374) and then injection of the post injector 110 is stopped (S376).

In the step S372, if the increment of oxygen concentration in the exhaust gas is less than the predetermined value, and then increment of HC slip amount is detected (S378). And if the HC slip amount is equal or larger than a predetermined value (Z ppm), the injecting pattern of the post injector 110 is modulated (S354). If the HC slip amount is less than a predetermined value (Z ppm), the regeneration of the NOx storage catalyst (S362) is maintained. (S370)

The predetermined value (Z ppm) is established for determining whether the HC slip is abnormally performed.

The predetermined value for the increment of oxygen concentration when the engine driving speed is decreased during regeneration of the NOx storage catalyst can be 5%.

If the engine operation speed is increased during regeneration of the NOx storage catalyst it is determine whether generating amount of the NOx is increased (S392), and then if the generating amount of the NOx is not increased, the regeneration of the NOx storage catalyst (S362) is maintained. If the generating amount of the NOx is increased, the second throttle flap 96 is closed in a predetermined angle for reducing the generating amount of the NOx (S394). And then the generating amount of the NOx is detected again and if the generating amount of the NOx is not increased, the regeneration of the NOx storage catalyst (S362) is maintained. However, if the generating amount of the NOx is increased, the injecting pattern of the post injector 110 is modulated (S354). (S390)

When it is determined that the engine operation condition is not changed in the step S364, then the NOx senor 150 detects the NOx concentration in the exhaust gas (S382). If the NOx concentration is not less than a predetermined value (W ppm), the regeneration of the NOx storage catalyst is maintained (S362). If so, the regeneration of the NOx storage catalyst stops (S384).

The predetermined value (W ppm) in the step S384 can be defined as a NOx concentration value indicating complete of the regeneration and the predetermined value (W ppm) can be determined by a kind and capacity of the NOx storage catalyst.

As described above, the controlling method for a purification system for variable post injection in LP EGR can improve retarded responsiveness of LP EGR (low pressure exhaust recirculation), control recirculation of the exhaust gas by controlling the DC motor, and modulate the injecting pattern of the post injector according to the engine operation conditions, the throttle flap openings, the generation of the NOx and so on. Thus, noxious gas can be reduced efficiently and fuel efficiency can be enhanced.

For convenience in explanation and accurate definition in the appended claims, the terms "forward" and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A purification system for variable post injection in LP EGR, the system comprising:
    a turbo charger disposed downstream of a diesel engine;
    a DPF (diesel particulate filter) disposed downstream of the turbo charger;

a NOx reduction apparatus disposed upstream or downstream of the DPF;
a bypass line diverged from the DPF for mixing exhaust gas and air inflowing the turbo charger;
an exhaust gas control portion disposed downstream of the DPF for controlling flowing of the exhaust gas; and
a lean/rich controlling portion for controlling a lean/rich state of the exhaust gas wherein the lean/rich controlling portion comprising:
a post injector disposed upstream of the NOx reduction apparatus; and
an injector control portion that determines injecting timing of the post injector according to NOx concentration and amount of the NOx and modulates fuel injection patterns according to engine driving conditions,
wherein the exhaust as control ortion comprises:
a first throttle flap that controls flowing of the exhaust gas flowing to the NOx reduction apparatus; and
a second throttle flap that controls flowing of the exhaust gas flowing to the bypass line,
wherein the first throttle flap is fixed to the second throttle flap and the first throttle flap and the second throttle flap are vertically disposed to each other,
wherein the exhaust gas control portion further comprises a DC motor and the DC motor controls openings of the first throttle flap and the second throttle flap simultaneously.

2. The system of claim 1, wherein the NOx reduction apparatus comprises:
a DFC;
a NOx storage catalyst; and
an anti HC slip catalyst.

3. The system of claim 2, wherein the NOx reduction apparatus further comprises an additional coating portion that is disposed upstream of the NOx storage catalyst for generating a reducing agent.

4. The system of claim 3, wherein the system further comprises:
an oxygen sensor disposed between the DPF and the NOx reduction apparatus;
a temperature sensor disposed between the DPF and the NOx reduction apparatus;
a HC slip sensor disposed downstream of the NOx reduction apparatus; and
a NOx sensor disposed at least one position of forward or rearward of the NOx reduction apparatus,
wherein the injector control portion receives operation state information including the amount of NOx in the exhaust gas, temperature of the exhaust gas, HC slip amount and NOx generation, and controls the injecting timing and modulating the fuel injection patterns of the post injector.

5. The system of claim 4, wherein the fuel injection pattern comprises:
a uniform injecting pattern in which a fuel in the post injector is uniformly injected into the NOx reduction system during a fuel injection period;
a first injecting pattern in which the fuel is injected into the NOx reduction with a concentrated state in an early stage of the fuel injection period;
a second injecting pattern in which the fuel is injected into the NOx reduction with a concentrated state in a middle stage of the fuel injection period;
a third injecting pattern in which the fuel is injected into the NOx reduction with a concentrated state in early and last stages of the fuel injection period; and
a fourth injecting pattern in which the fuel is injected into the NOx reduction with a concentrated state in the last stage of the fuel injection period.

6. The system of claim 1, the system further comprises:
an oxygen sensor disposed between the DPF and the NOx reduction apparatus;
a temperature sensor disposed between the DPF and the NOx reduction apparatus;
a HC slip sensor disposed downstream of the NOx reduction apparatus;
a NOx sensor disposed at least one position of forward or rearward of the NOx reduction apparatus; and
a throttle flap opening sensor for sensing opening of the first throttle flap and the second throttle flap,
wherein the injector control portion that receives operation state information including the amount of NOx in the exhaust gas, temperature of the exhaust gas, HC slip amount, NOx generation and throttle openings, and controls the injecting timing and modulating the fuel injection patterns of the post injector.

* * * * *